United States Patent [19]
Darm

[11] 3,905,850

[45] Sept. 16, 1975

[54] METHOD OF MANUFACTURE OF AN AIR-TO-AIR HEAT EXCHANGER

[76] Inventor: William J. Darm, 5818 SW. Tucker, Beaverton, Oreg. 97005

[22] Filed: May 10, 1974

[21] Appl. No.: 468,659

Related U.S. Application Data

[63] Continuation-in-part of Ser. No. 31,092, April 23, 1970, abandoned, Continuation of Ser. No. 221,543, Jan. 28, 1972, abandoned.

[52] U.S. Cl. ............... 156/91; 29/157.3 D; 29/460; 113/118 D; 156/245; 156/298; 156/305; 165/166

[51] Int. Cl.² ................... B32B 7/08; B23P 15/26; B29C 27/00; B29D 3/00

[58] Field of Search ....... 165/165, 166; 29/157.3 D, 29/460, 527.1; 113/118 R, 118 D; 156/298, 91, 92, 242, 245, 305

[56] References Cited
UNITED STATES PATENTS

| | | | |
|---|---|---|---|
| 1,409,520 | 3/1922 | Bird | 165/166 X |
| 1,831,533 | 11/1931 | Hubbard | 165/166 |
| 2,794,756 | 6/1957 | Leverenz | 156/305 X |
| 2,975,092 | 3/1961 | Hagerty | 156/305 X |
| 3,042,572 | 7/1962 | Verhulst | 156/305 X |
| 3,103,971 | 9/1963 | Freyholdt | 165/165 |
| 3,139,679 | 7/1964 | SaJ | 113/118 R X |
| 3,381,747 | 5/1968 | Darm | 165/166 |
| 3,473,604 | 10/1969 | Tiefenbacher | 165/166 |
| 3,525,391 | 8/1970 | Day | 165/166 |
| R17,973 | 2/1931 | Mosher | 165/166 X |

*Primary Examiner*—Charles E. Van Horn
*Assistant Examiner*—Thomas E. Bokan
*Attorney, Agent, or Firm*—Klarquist, Sparkman, Campbell, Leigh, Hall & Whinston

[57] ABSTRACT

A heat exchanger is described along with a method of manufacture with metallic or otherwise conductive exchanger plates disposed in substantial parallelism within the exchanger. In making the exchanger, the exchanger plates are arranged in substantial parallelism and edges joined together with clips which tie the plates together as a unit bundle. A layer comprising a mixture of hardenable resin and reinforcing material is prepared, and the unit bundle of plates is placed with a set of adjacent edges of the plates in said layer. When the resin hardens, the layer forms a rigid slab extending along said set of edges. The process may be repeated on the opposite set of adjacent edges in the bundle of exchanger plates. The hardened resin masses which bind the edges of the plates together form part of an enclosing housing which is prepared about the exchanger plates to complete the exchanger.

7 Claims, 5 Drawing Figures

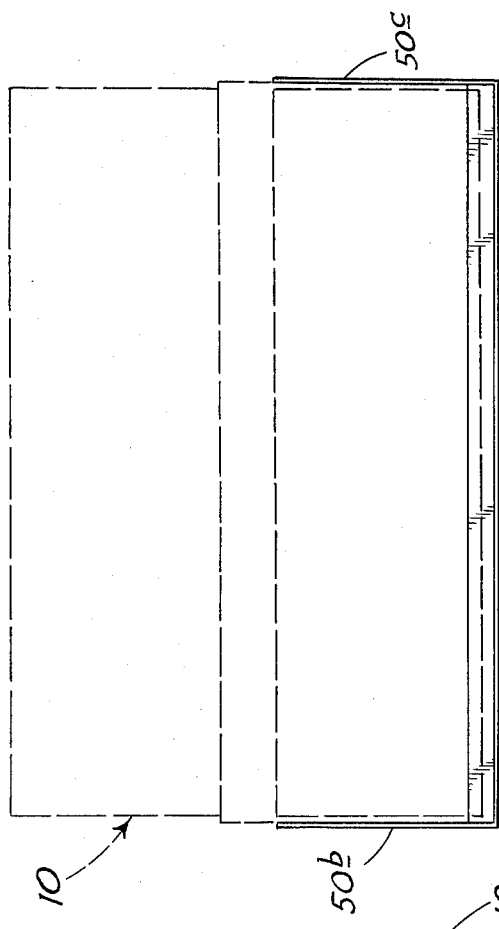
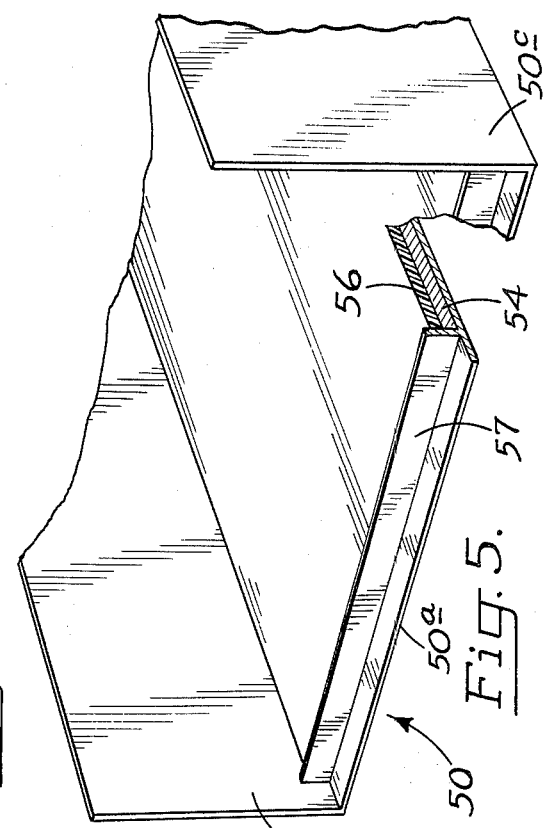
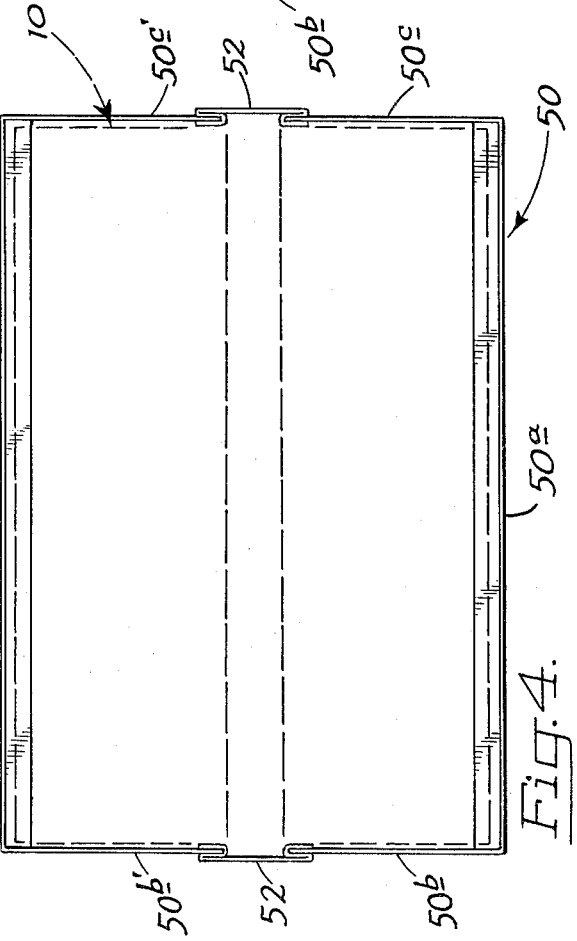

METHOD OF MANUFACTURE OF AN AIR-TO-AIR HEAT EXCHANGER

This application is a continuation-in-part of prior-filed application entitled "Air-to-Air Heat Exchanger," Ser. No. 31,092, filed Apr. 23, 1970 now abandoned, and continuation of Ser. No. 221,543, filed Jan. 28, 1972, now abandoned.

The instant invention relates to heat exchanger apparatus. The heat exchanger is particularly adapted for exchange of heat between flowing streams of gas, as exemplified by an air-to-air heat exchanger of the type that might be used in a building ventilating system.

Heat exchangers have been proposed in U.S. Pat. No. 3,381,747 comprising a series of heat exchanger plates disposed within a housing defining a multiplicity of channels extending side-by-side along the housing and constructed so that fluid flowing in alternate ones of the channels exchanges heat with fluid flowing in the remainder of the channels. To be efficient, the exchanger plates defining such channels should have large surface expanses exposed to the fluids passing through the exchanger. Toward these ends, I have found that thin metallic sheets of considerable width, and preferably corrugated to increase the turbulence of fluids passing through the exchanger, may be utilized in producing a highly satisfactory exchanger for many types of applications.

In the manufacture of such an exchanger, because of the flexible nature of the plates or sheets making up the exchanger plates, and the great number of plates which ordinarily make up a typical exchanger, there are certain problems presented in assembling the unit with the plates properly positioned in a permanent manner within the exchanger, and with the completed unit having the desired strength and rigidity. To be kept in mind also is any method utilized in making the exchanger should be one which lends itself to be performed without the need of using highly trained personnel, and in a quick and expeditious manner.

Generally, therefore, an object of this invention is to provide a method of manufacture of a new and improved heat exchanger, featuring heat conductive exchanger plates dividing the interior of the exchanger into multiple channels for the flow of the fluids between which heat exchange is to take place, which is a strong, rigid and highly serviceable unit, and which has a construction such that it can be readily assembled by ordinary shop personnel in a quick and efficient manner.

Another object is to provide a novel method of making such a heat exchanger, wherein exchanger plates are first assembled in parallelism in substantially the relative position that they have in the completed exchanger, and adjacent edges of such plates are then encased in a resinous mass which seals together these edges and unifies the bundle of plates. Such resinous mass becomes part of the final housing which encloses the exchanger plates, serving permanently to fix the positioning of the plate edges and forming a rigid strengthening panel along a side of the completed housing.

Yet another object of the invention is to provide such a process wherein the exchanger plates prior to being encased within such a resinous mass are assembled in parallelism, with clips holding the respective plates together in a proper relative position to form a unit bundle which is easily handled during later processing when edges of the plates are encased in resin.

According to a preferred embodiment of the invention, the resinous mass that is utilized to encase the sets of edges of the plates is contained as a layer within a form of sheet metal, which sheet metal ultimately becomes part of the housing for the exchanger.

These and other objects and advantages of the invention will become more fully apparent from the following description, to be read in conjunction with the accompanying drawings, wherein:

FIG. 2 is an end view, on a somewhat smaller scale, showing such assembly of plates;

FIG. 3 is an end view illustrating such assembly of exchanger plates (with the outline only of such assembly depicted in dot-dash outline) positioned in a housing section, according to one of the steps in the manufacture of the heat exchanger according to the invention;

FIG. 4 is an end view of a completed housing prepared as contemplated herein (with the plate assembly again depicted in dot-dash outline); and FIG. 5 is a perspective view illustrating a housing section, with a layer of resin material prepared therein, which is done prior to the placement within the section of the assembly of exchanger plates.

Figure 1:
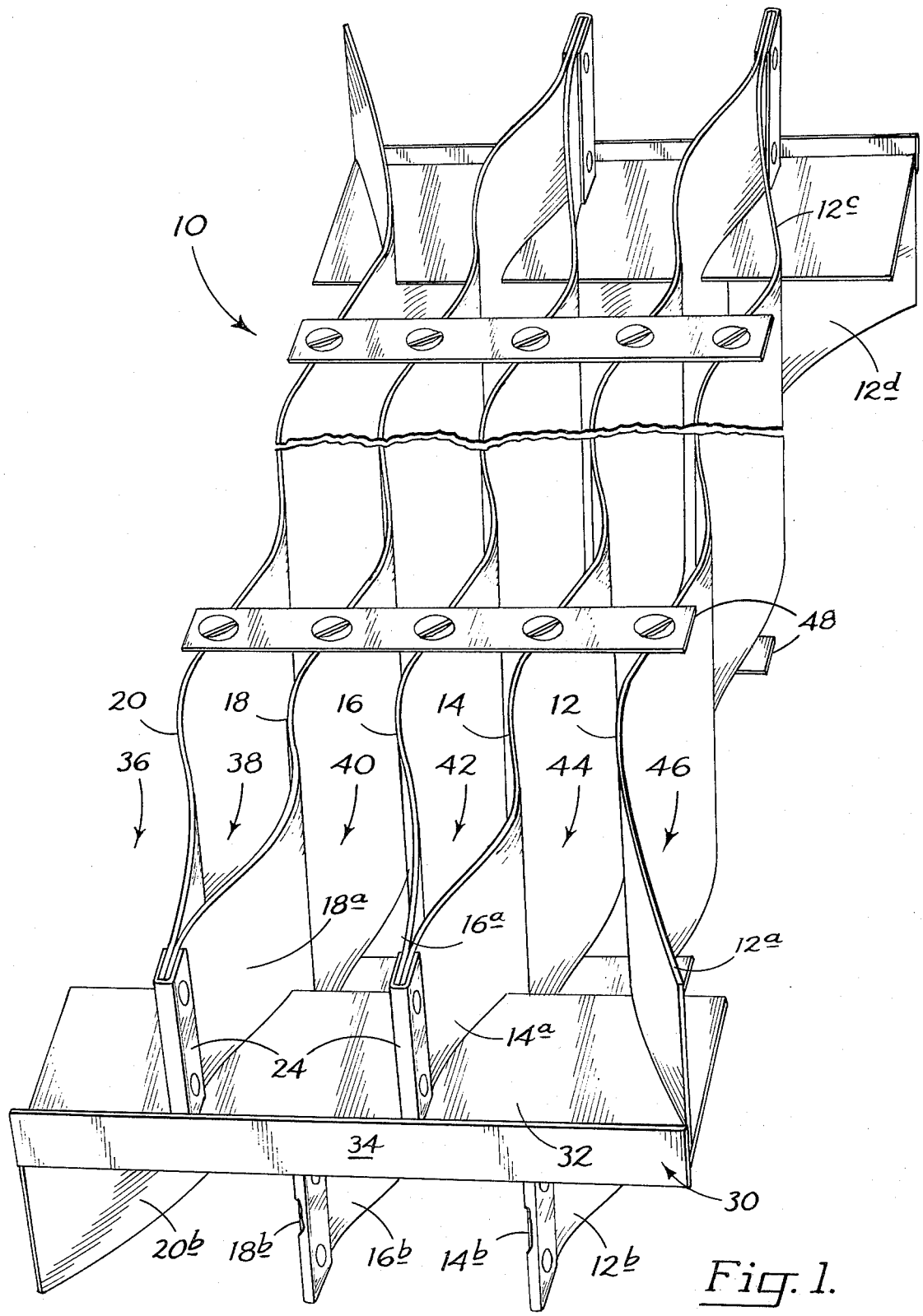
FIG. 1 is a view illustrating, in perspective and somewhat diagrammatically, an assembly of exchanger plates as such might be assembled according to the manufacture of the invention.

Referring now to FIG. 1, an assembly of exchanger plates is illustrated such as might be employed for the internal division of a heat exchanger housing as contemplated according to the invention. Such assembly of exchanger plates, also referred to as a core element, has been given the reference numeral 10.

The assembly 10 illustrated in FIG. 1 is made up of five exchanger plates, which are designated at 12, 14, 16, 18, and 20. The plates are arranged in the assembly in substantial parallelism. Each of the plates has a length conforming substantially to the length of the exchanger with which the assembly is to be incorporated. The plates further may be provided with corrugations extending transversely of the plates, whereby any fluid, usually gas, moving through the exchanger is given a degree of turbulence.

Each of the plates at each of its ends is split with a cut extending longitudinally of the plate. The cut parallels the longitudinal edges of the plate, and normally is made about midway between the longitudinal edges, thus to divide the end of each plate into a pair of tongue segments, exemplified by a tongue segments 12a and 12b, of equal width.

The tongue segments of each exchanger plate end are shown bent in reverse directions. Thus tongue segment 12a, as shown in FIG. 1, is bent to curve outwardly (where it will meet with the housing of the exchangers which is assembled about the core element) and tongue segment 12b below segment 12a is bent to curve inwardly. Considering exchanger plate 14, its upper tongue segment 14a is bent inwardly, whereas its lower tongue segment 14b is bent outwardly to meet tongue segment 12b. Where adjacent ends of tongue segments meet, they may be fixed together using an overlying angle piece, such as angle piece 24, secured in place as by crimping.

It will be noted that whereas the upper tongue segment 12a of plate 12 is bent outwardly, and the lower one 12b is bent inwardly, at the opposite end of the exchanger plate the upper tongue segment 12c is bent inwardly whereas the lower one is bent outwardly. This same relationship holds true for the tongue segments at each set of ends of an exchanger plate. A divider member shown at 30, including a horizontal wall expanse 32 and a vertical marginal flange 34, may be inserted into cuts forming the tongue segments, at each set of ends of the exchanger plates. The divider member, when positioned as shown in FIG. 1, serves to separate end portions of channels defined on opposite sides of the various plates. Thus, and considering channel 40 in FIG. 1, the divider separates this channel where such is defined between tongue segments 18a, 16a, from portions of channels 38 and 42 below the divider, defined between tongue segments 20b, 18b and 16b, 14b, respectively.

As shown in FIG. 1, channels 36, 40, and 44, at the end of the assembly pictured at the bottom of FIG. 1, open to the end of the assembly above the divider. At the opposite end of the assembly, these channels open up to the end of the assembly below the divider. The reverse is true for channels 38, 42, and 46, which at the end of the assembly pictured at the bottom of FIG. 1, open to the end of the assembly below the divider, and at the opposite end of the assembly, open to the end of the assembly above the divider.

With the arrangement, and assuming the presence of an encompassing casing, it should be obvious that one set of channels may be utilized for the passage of one body of fluid through the exchanger, and an alternating set for the passage of another body of fluid through the exchanger, with such bodies of fluid passing through multiple flow paths interspersed with each other.

In making an exchanger with a core element of the type described, and when it is remembered that typically a far greater number of exchanger plates are utilized than actually pictured in FIG. 1 (FIG. 1 showing a simplified version for reasons of clarity), it should be obvious that a problem arises with respect to positioning properly the adjacent exchanger plates where they extend in expanses between the ends of the plates. The plates usually are made of thin metal, and if corrugated transversely of their lengths, have considerable flexibility in a transverse direction. Further, they are easily twisted. Obviously, if the plates are not properly oriented in the completed exchanger with substantially uniform spacing existing between them where they extend throughout their length, the efficiency of the exchanger is affected.

Thus, according to this invention, the various exchanger plates are arranged substantially as pictured in FIG. 1. During assembly, and to tie the various exchanger plates together, tying and spacer clips 48, which may be metal strips attachable to the edges of the plates, are assembled with the plates by fixedly attaching them to the edges of the plates at regions spaced along the length of the assembly. The clips are attached to each of the opposite sets of adjacent edges in the plate assembly. The tying clip specifically illustrated has slotted depressions formed in it, the slots receiving edge portions of the plates, which may be twisted slightly after being passed through the slots to hold the clip in place. The exchanger plates are also fastened together at their ends through joinder of the tongue segments with angle pieces 24.

Shown in FIG. 5 is a casing or housing section, given the reference numeral 50. Such generally has a channel shape, and includes a base web 50a and opposed upstanding flanges 50b, 50c.

As a next step in the manufacture of the exchanger, a set of adjacent edges in the exchanger plate assembly 10 is permanently fixed by embedding or encasing the edges in a resin slab.

In preparing such a slab, reinforcing material, such as a fiberglass sheet, is laid down along the interior of casing section 50 on web 50a of the section. The sheet may have dimensions substantially corresponding to the dimensions of the web. Such sheet has been generally indicated in FIG. 5 at 54. Poured over this sheet is a mass of uncured, hardenable resin material 56, such as a liquid epoxy resin, which is a thermosetting resin which cures to form a hard mass. The resin impregnates the reinforcing sheet, and the resin and sheet form a hardenable layer disposed within the casing section 50. The casing section, which may be made of sheet metal, constitutes a form confining the resin layer during this stage of the manufacture. Metal pieces, such as the one shown at 57, may be attached to span the width of web 50a at each end of the casing section, to confine the resinous layer at the ends of the casing section.

The assembly of exchanger plates may then be fitted within the casing section, with a set of edges of the plates, as well as any tying strips connecting these edges, then pressed downwardly to be sunk into the layer of resin and reinforcing material. What results has the appearance of what is shown in an end view in FIG. 3. After a period of time, on curing of the resin mass, a strong, rigid slab results which extends along the top of web 50a. Such slab seals the edges of the plates, and provides insulation along one side of the exchanger, as well as forming a rigid structural element along one side of the plate assembly.

This operation may then be repeated by preparing in another casing section resembling section 50 another layer of resin and reinforcing material similar to the one just described. The assembly of exchanger plates may then be inverted, and the edges in the opposing set of edges of the plates, together with tying strips, sunk into this layer of material. On hardening, another rigid slab is thus prepared encasing the edges of the opposing set, and forming a rigid unit of slab and various exchanger plates.

An article prepared as above includes the core element of assembled exchanger plates, having cured slabs of reinforced resin uniting and sealing the edges in the opposed set of edges of the plates. Encompassing the slabs of resinous material, and portions of the sides of the exchanger plate assembly, are casing sections such as those shown at 50 and 50' in FIG. 4. It is an easy matter to complete the casing or housing in the exchanger by uniting together the opposing flanges 50b, 50b', and 50c, 50c' of the casing sections 50, 50' utilizing strips 52 which are fastened about the edges of the flanges involved. Each of these strips may extend the length of the heat exchanger. The fastening may be by welding, pop rivets, etc. With placement of the strips, a housing is formed comprising the resinous slabs uniting the adjacent edges of the exchanger plates, and the sheet material surrounding these slabs, including webs 50a, 50a', and the flanges 50b, 50b', and 50c, 50c'.

It should be obvious that a versatile and practical heat exchanger is proposed which can be readily made in a variety of lengths, sizes, and capacities. Manufacture of the exchanger may readily be done without specialized equipment in the usual manufacturing plant.

It is claimed and desired to be secured by Letters Patent:

1. In the manufacture of a heat exchanger comprising a housing and substantially parallel exchanger plates disposed within said housing defining a multiplicity of channels disposed side by side between the exchanger plates, which channels are provided as two separate sets of channels extending between the ends of the housing, the method comprising:

assembling a plurality of separate heat exchanger plates into a unit in substantially the same relative position they have within said housing by supporting the exchanger plates in spaced relationship with a spacer means which is permanently attached to the longitudinal edges of said plates to fasten said plates together in said spaced relationship;

joining the opposite ends of the exchanger plates to the ends of other exchanger plates adjacent thereto, at least some of said plates having ends divided into two end portions which are joined to different exchanger plates on opposite sides thereof to form said two separate sets of channels;

preparing a layer of uncured hardenable resin;

positioning the assembly of exchanger plates with a set of adjacent longitudinal edges including portions of the joined ends of the exchanger plates sunk into said layer;

permitting the layer to harden to form a slab which is joined and encases said edges; and mounting said assembly within an enclosing housing with said slab forming part of said housing.

2. The method of claim 1, wherein the layer of resin includes reinforcing material and after the layer of resin and reinforcing material has hardened to form a first slab encasing said set of edges, another layer of uncured hardenable resin and reinforcing material is prepared, and a set of adjacent edges of said exchanger plates opposite said first mentioned set of edges is sunk into this other layer, said other layer is permitted to harden to form a second slab encasing said opposite set of edges, and said second slab forms another part of the enclosing housing which is prepared about said assembly of plates.

3. The method of claim 2 wherein the layer of resin and reinforcing material is prepared within a container form, said form is made of sheet material, and said sheet material also forms part of the housing prepared about said assembly of plates.

4. The method of claim 1 wherein the spacer means supporting the exchanger plates are clips extending across the adjacent set of longitudinal edges of said plates so that said edges are fastened in a plurality of spaced slots in said clips to fix the spacing of these edges, and such clips are sunk into said layer along with said set of edges.

5. In the manufacture of a heat exchanger the method comprising:

assembling multiple exchanger plates;

securing the edges in each of two opposite sets of adjacent edges of the plates with spacer clips which set the spacing of the edges and tie the plates together as a unit in the assembly;

joining the opposite ends of the exchanger plates to the ends of other exchanger plates adjacent thereto, at least some of said plates having ends divided into two end portions which are joined to different exchanger plates on opposite sides thereof to form two separate sets of channels; and sealing the two opposite sets of edges of the assembly of exchanger plates with layers of resin and permitting the resin to harden about said opposite sets of edges.

6. The method of claim 5, wherein each layer of resin is confined within a form made of sheet material, and after hardening of the two layers of resin a housing is prepared enclosing the exchanger plates with joinder of the sheet material of said forms.

7. The method of claim 6, wherein a pool of resin is prepared by first preparing an elongated form of sheet material shaped as a side of the heat exchanger, placing in said form fiberglass sheet material and liquid resin to form a mixture of the liquid resin and sheet material which functions as a reinforcing material.

* * * * *